United States Patent

[11] 3,609,329

[72] Inventor Harold M. Martin
South Houston, Tex.
[21] Appl. No. 821,756
[22] Filed May 5, 1969
[45] Patented Sept. 28, 1971
[73] Assignee Shell Oil Company
New York, N.Y.

[54] THRESHOLD LOGIC FOR INTEGRATED FULL ADDER AND THE LIKE
16 Claims, 7 Drawing Figs.

[52] U.S. Cl. .......... 235/176, 235/172, 307/205, 307/211
[51] Int. Cl. .......... G06f 7/50, H03k 19/08, H03k 19/42
[50] Field of Search .......... 235/176, 172; 307/205, 211, 213

[56] References Cited
UNITED STATES PATENTS

| | | | |
|---|---|---|---|
| 3,260,863 | 7/1966 | Burns et al. | 307/205 |
| 3,427,445 | 2/1969 | Dailey | 307/205 X |
| 3,440,413 | 4/1969 | Betts | 235/176 |

*Primary Examiner*—Eugene G. Botz
*Assistant Examiner*—David H. Malzahn
*Attorneys*—T. E. Bieber and J. H. McCarthy

ABSTRACT: Threshold logic functions are carried out by the use of an insulated-gate field effect transistor (IGFET) connected as a sampler transistor in series with a not-clock input and a parallel combination of several data input IGFET's. The sampler transistor and the data input transistor combination form a voltage divider whose center tap is connected to the input of an IGFET inverter operated from a clock input. By using data input IGFET's with different "on" resistances, the data inputs can be selectively weighted, and a full adder circuit can be constructed with only 15 components, all of which are IGFET's, and all of which can be manufactured on a single chip.

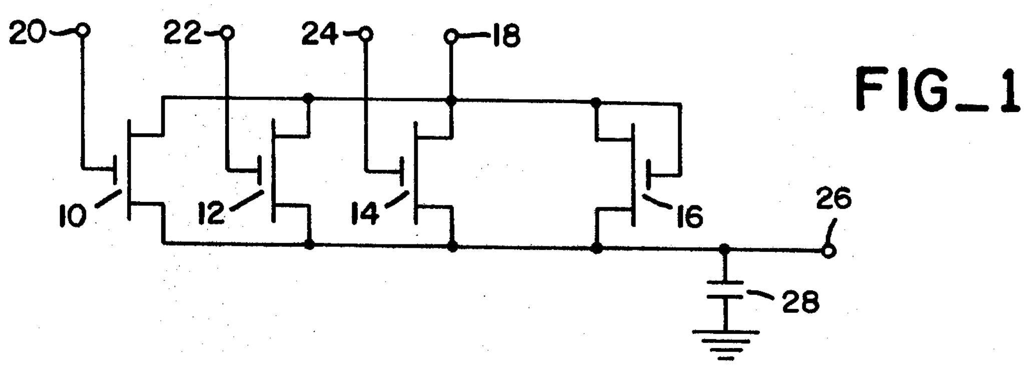
FIG_1
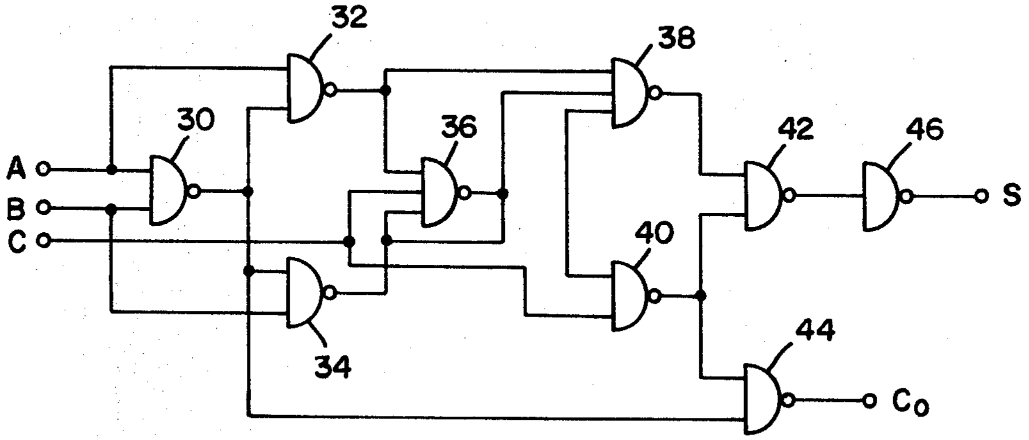
PRIOR ART FIG_2
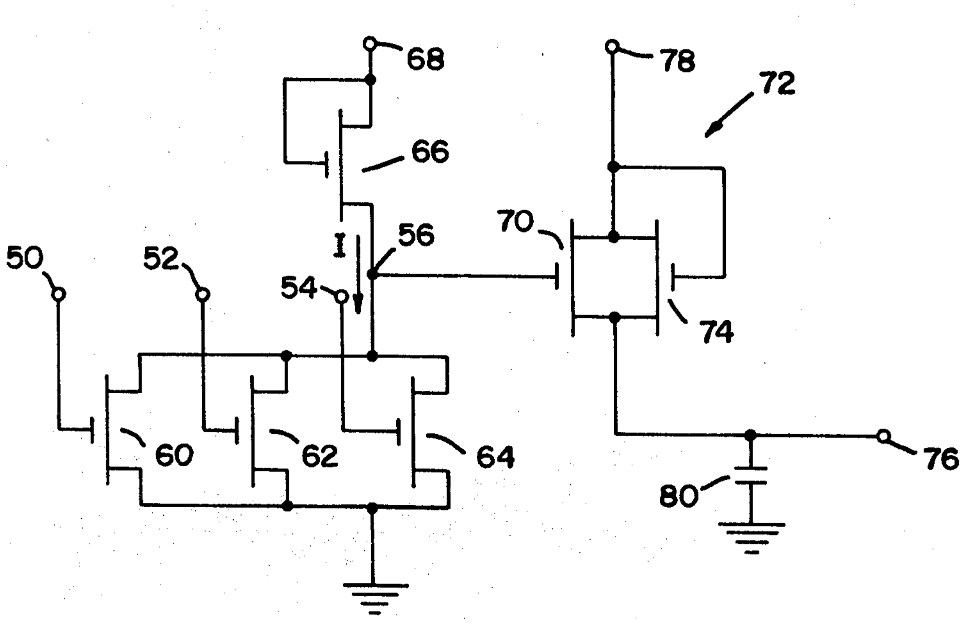
FIG_3
INVENTOR
HAROLD M. MARTIN
BY
Mellin, Moore & Weissenberger
ATTORNEYS INVENTOR.
HAROLD M. MARTIN
BY
Mellin, Moore & Weissenberger
ATTORNEYS INVENTOR.
HAROLD M. MARTIN
BY
Mellin, Moore & Weissenberger
ATTORNEYS INVENTOR.
HAROLD M. MARTIN
BY
Mellin, Moore & Weissenberger
ATTORNEYS

THRESHOLD LOGIC FOR INTEGRATED FULL ADDER AND THE LIKE

BACKGROUND OF THE INVENTION

An inverter circuit using insulated-gate field effect transistors (IGFET's) has been disclosed in the copending application Ser. No. 787,067, filed Dec. 26, 1968, and entitled TRANSISTOR INVERTER CIRCUIT, now U.S. Pat. No. 3,502,908, issued Mar. 24, 1970. These circuits are particularly suited for integrated circuit chips due to the fact that they consist entirely of metal-oxide silicon field effect transistors (MOSFET's). Circuits consisting only of MOSFET's and their interconnecting leads can be economically made out of a single silicon chip. Also, circuits of this type need no DC supply and have very low power dissipation. Consequently, these circuits can be made very small, so that a great many circuits can be placed on a single chip, with a corresponding reduction in cost per circuit. In addition, the inverter circuits disclosed in said application which are known as FARMOST (for Fast Ratioless Metal-Oxide Silicon Transistor) inverters are extremely fast acting, with operation in the nanosecond range.

SUMMARY OF THE INVENTION

In the circuit of the aforesaid copending application, the data input to the inverter consists of a single IGFET. By connecting several IGFET's in parallel on the data input side, and supplying different data inputs to their gate electrodes, the inverter becomes a NOR gate, i.e., a logic circuit which produces an output only whenever there is no data input from any of the data input channels.

Carrying this thought a step further, a voltage divider can be devised by connecting the data input IGFET's in parallel, and connecting the parallel combination in series with an IGFET gated by a clock signal. The voltage appearing across the parallel combination is proportional to the number of data "ones" appearing at the data input, and this total data voltage can be applied to the data input of the inverter of the copending application.

Depending on the parameters of the series-parallel IGFET's, the circuit can be arranged so that it takes any predetermined number of "ones" coinciding at the data inputs before the total data voltage drops below the threshold inverter input voltage at which the inverter switches from a "-zero" output to a "one" output.

Inasmuch as IGFET's can be made to have a wide variety of "on" resistances, it is possible to "weight" one data channel with respect to another by the proper choice of IGFET's. This property is put to use in the invention by connecting a pair of threshold circuits and an inverter to form a full adder with no components other than 15 IFGET's, all of which can be formed on a single chip.

It is therefore the object of the invention to provide a threshold circuit using a single chip comprising only IGFET's, with no external resistors or capacitors, and without any DC supply.

It is another object of the invention to provide a weighted threshold circuit of the type described.

It is a further object of the invention to provide a simplified full adder using only weighted IGFET threshold circuits on a single chip.

BRIEF DESCRIPTION OF THE DRAWINGS

FIG. 1 is a circuit diagram of an IGFET NOR gate;

FIG. 2 is a logic diagram of a prior art NOR gate adder;

FIG. 3 is a circuit diagram of a three-channel simple threshold gate according to this invention;

DESCRIPTION OF THE PREFERRED EMBODIMENT

Figures 4, 5:
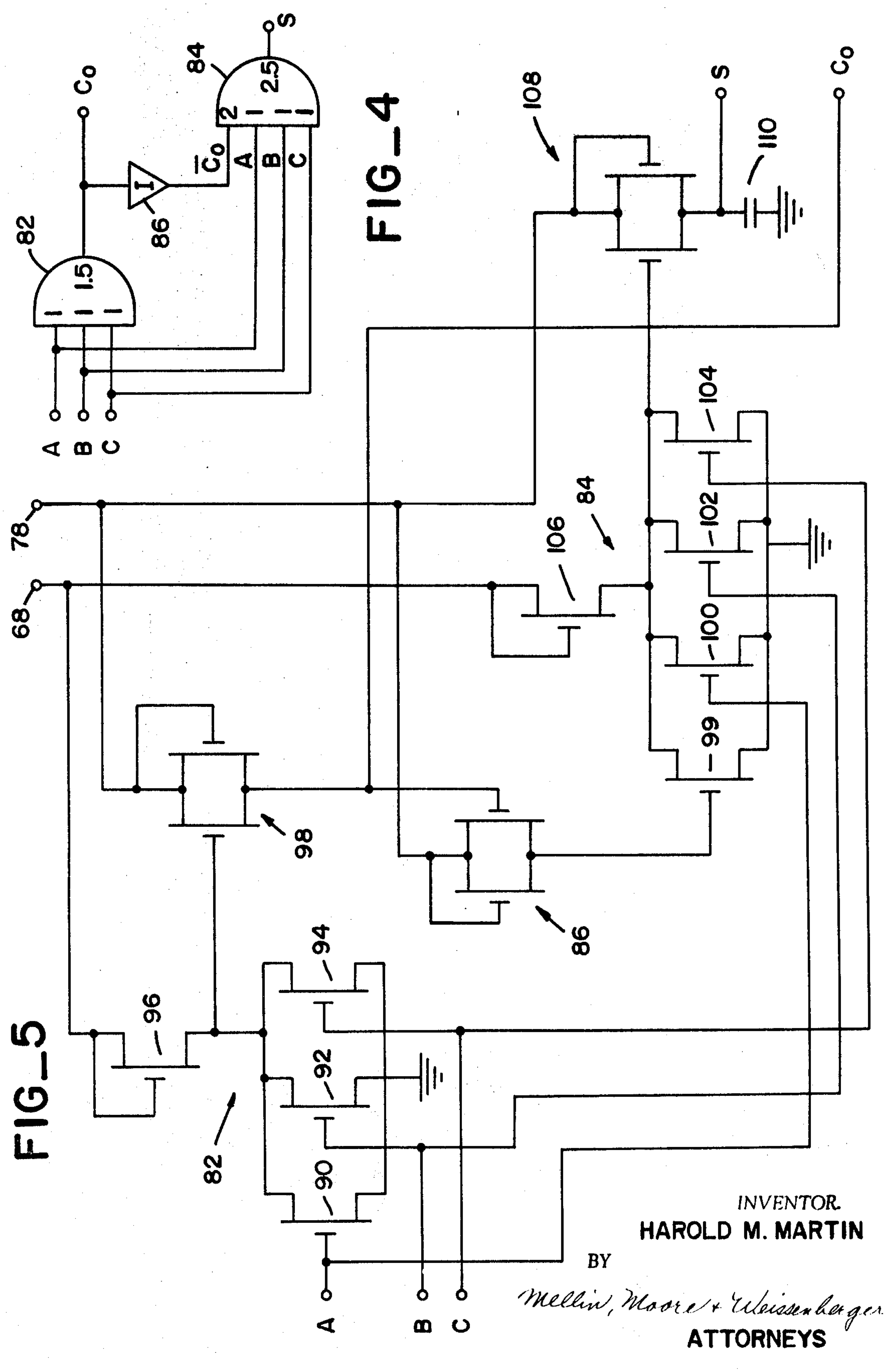
FIG. 4 is a logic diagram of the two-level full adder of this invention.
FIG. 5 is a circuit diagram of the adder of FIG. 4, using IGFET's.

FIG. 1 shows a three-channel IGFET NOR circuit. This circuit is composed of three parallel-connected data input transistors 10, 12, 14 (one for each channel) and a fourth parallel-connected precharging transistor 16. The drain electrodes of all four transistors, as well as the gate electrode of the precharge transistor 16, are connected to a low-impedance clock input 18. The gate electrodes of data input transistors 10, 12, 14 are connected, respectively, to the three data input channels 20, 22, 24. The source electrodes of all four transistors are connected together to form the output 26 of the circuit. The capacitor 28 represents the input capacitance of the next stage. This next stage is either another FARMOST stage or the input capacitance of some interface circuit to other types of logic or pulse circuitry. If the interface contains insufficient inherent capacitance, an appropriate amount of additional capacitance must be provided in parallel with the interface. These connections make it possible to manufacture the entire NOR circuit on a single chip, without external parts.

Basically, as explained in the above-identified copending application, the precharge transistor 16 conducts during the clock or timing pulse and charges capacitance 28 to clock potential minus one threshold voltage. If any of the data channels 20, 22, or 24 are in the "1" condition after cessation of the clock pulse, capacitance 28 discharges through the data input transistor associated with that channel. If, on the other hand, all data channels remain in the "0" condition, one of the data input transistors conduct, and the capacitance 28 cannot discharge.

The time constant of the RC circuit formed by capacitance 28 and the "on" resistance of the data input transistors 10, 12, 14 plus the impedance of the clock input 18 is such that capacitance 28, if it discharges, does so in less time than the interval between pulses. Consequently, if the output 26 is, say, the channel 20 input of the next following NOR circuit, the latter will be, at the next clock pulse, in the condition dictated by the conditions of the channels 20, 22, and 24 of the original stage during the original clock pulse.

The circuit of FIG. 1 can be used, e.g., for each of the nine NOR gates in the prior art full adder shown in FIG. 2. In that device, A may be, e.g., one bit of one of two N-bit binary numbers, B may be the corresponding (i.e., same significance) bit of the other N-bit binary number, and C may be the carry from the addition performed by a similar adder on the next least significant bit of the N-bit binary number. With these inputs, a study of the diagram of FIG. 2 will readily reveal that output S represents the binary sum of A, B, and C, and that output $C_o$ represents the carry of the summing operation of A, B, and C. In the example described, S and $C_o$ may form the B and C inputs, respectively, of the next following full adder stage.

FIG. 3 shows the basic single-chip IGFET threshold gate of this invention in a three-channel configuration. The data or addend inputs 50, 52, 54 are applied to the gate electrodes of three data input transistors 60, 62, 64 connected in parallel. The common source connection is to ground, and the common drain connection is connected at point 56 to the source electrode of a sampling transistor 66. The drain and gate electrodes of sampling transistor 66 are connected together, and a "not-clock" input or timing pulse source 68 is connected thereto.

Inasmuch as the sampling transistor 66, connected in this manner, acts as a simple resistance, it could be replaced by a resistor; however, resistors do not lend themselves to single-chip integrated circuit manufacture, and therefore an IGFET is preferred.

The voltage appearing at point 56 when the sampling transistor 66 is conducting constitutes a total-data signal which is applied to the input of a suitable output-producing means, e.g., to the gate electrode of total-data input transistor 70 of an inverter circuit 72 constructed in accordance with the aforesaid copending application. The common source connection of total-data input transistor 70 and inverter transistor 74 constitutes the output 76 of the threshold gate.

The common drain connection of transistors 70, 74 and the gate electrode of precharge transistor 74 are connected to a low-impedance clock input or timing pulse source 78, and the gate-to-ground capacitance 80 of the next stage's input provides the output signal storage as described in connection with FIG. 1 hereof. The timing or clock pulses are generated by sources not shown and are normally supplied by circuits that control the operation of the system using the logic circuit of this invention.

The threshold circuit of FIG. 3 operates as follows: During the absence of the clock or timing pulse, a strongly negative potential appears at the "not-clock" input 68. Sampling transistor 66 is so chosen that its "on" resistance is about an order of magnitude larger than the "on" resistances of the data input transistors 60, 62, 64. Consequently, if a data pulse is present at one or more of the data inputs 50, 52, 54, the sampling transistor 66 acts as a current source which furnishes a current I to the parallel circuit of transistors 60, 62, 64. As a result, sampling transistor 66 and the parallel circuit form a voltage divider whose center tap is point 56.

The voltage drop across the parallel circuit can be expressed as $$V=\frac{I}{X_1G_1+X_2G_2+X_3G_3}$$

where $G_1$, $G_2$, $G_3$ are the conductances of transistors 60, 62, 64 respectively, and $X_1$, $X_2$, $X_3$ are tee binary data inputs at 50, 52, 54 respectively. In other words, $X_1$, $X_2$, $X_3$ can each assume either the value 1 (if a data pulse is present) or 0 (if no data pulse is present).

It will be readily seen from equation (1) that the more data pulses present, the smaller $V$ will be. If the "on" resistances (and hence "on" conductances $G$) of transistors 60, 62, 64 are equal, the relation is as follows:

$V=I/G$ with one "1" data input (2)

$V=\frac{1}{2}I/G$ with two "1" data inputs (3)

$V=\frac{1}{3}I/G$ with three "1" data inputs (4)

With no "1" data input, the parallel combination of transistors 60, 62, 64 is essentially an open circuit, and $V$ is substantially the entire potential $V_N$ of the "not-clock" input 68.

Figure 6:
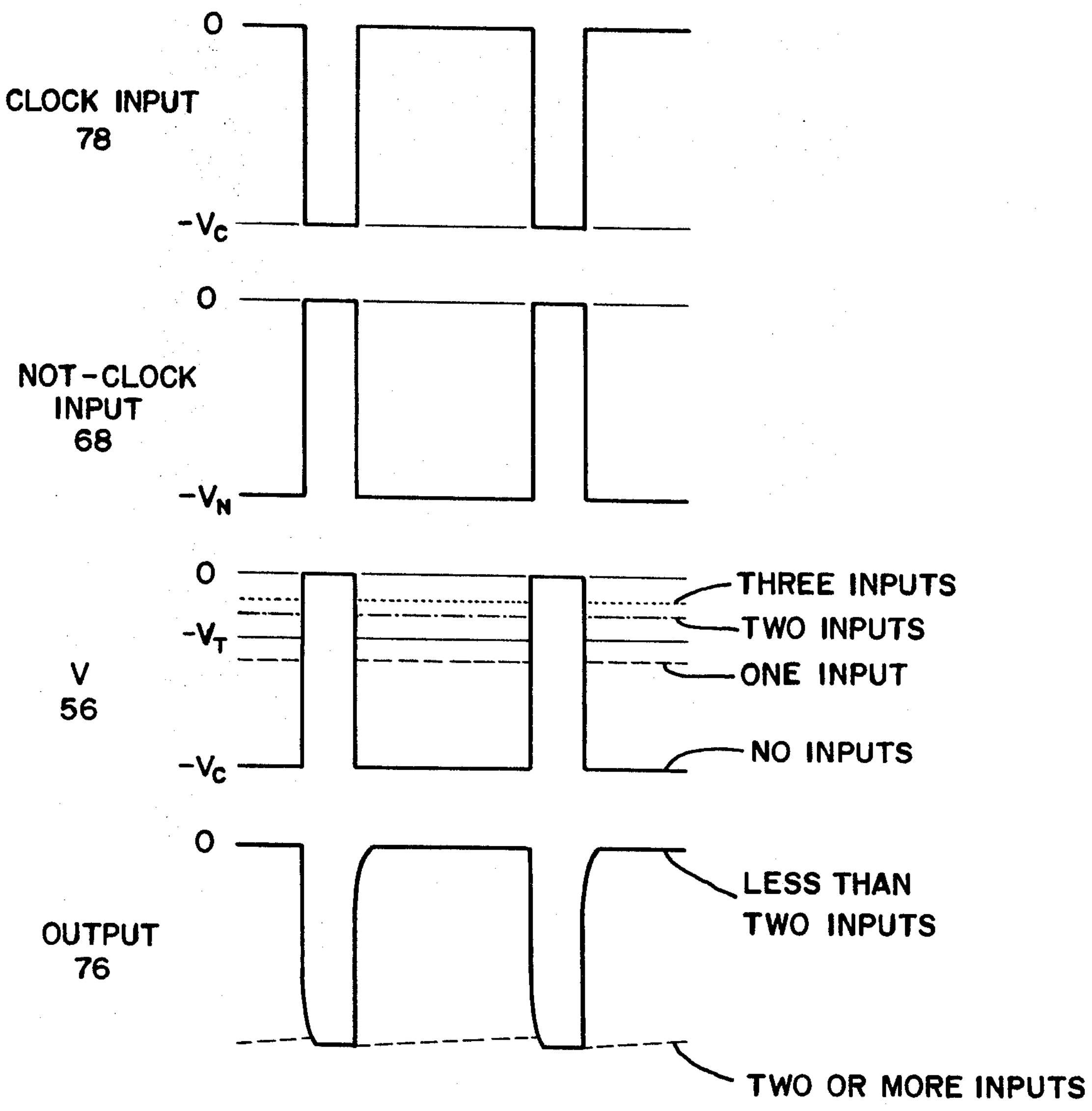
FIG. 6 is a time-amplitude graph illustrating the action of the circuit of FIG. 3.

Turning now to the inverter circuit 72, it will be noted that, as explained in the aforesaid copending application, the total-data input transistor 70 will not conduct unless the negative voltage applied to its gate electrode exceeds a threshold value $V_T$ (FIG. 6). Inasmuch as the gate electrode of transistor 70 is connected to point 56, the voltage applied to it is $V$.

By proper selection of the "not-clock" potential $V_N$ and the "on" resistance of sampling transistor 66 (which determine $I$), and of the "on" resistances of the data input transistors 60, 62, 64 (which determine $G$), the expression $I/G$ in equations (2) through (4) can be made smaller or larger as desired. Consequently, the circuit can be so proportioned that it takes one, two, or three "1" data inputs before $V$ drops below $V_T$ to produce an output at 76. In the first instance, the threshold circuit of FIG. 3 becomes an OR gate; in the second, a majority gate; and in the third, an AND gate.

FIG. 6 shows the relation of the voltages appearing at various points in the majority gate configuration of the circuit of FIG. 3. The negative output voltage imparted to capacitance 80 persists throughout the interval between clock pulses unless erased by conduction of transistor 70 (when $V>V_T$) during that interval.

Up to this point, it has been assumed that the data input transistors 60, 62, 64 of FIG. 3 have equal "on" resistances. An additional advantage of the circuit can be realized by departing from this assumption. For example, if transistor 60 has only one-half the "on" resistance of transistor 62 or 64, its "on" conductance $G_1$ is double the "on" conductance $G_2$ or $G_3$, and if the latter are designated as $G$, equation (1) becomes $$V+\frac{I}{2X_1G+X_2G+X_3G}=.I/G\ \frac{1}{2X_1+X_2+X_3} \qquad (5)$$

The effect of a "1" input at inputs 50, 52, 54 under these conditions can be shown in Table I below:

Table I

| "1" inputs | $V$ |
|---|---|
| None | $V_N$ |
| 50 only | $\frac{1}{2}I/G$ |
| 52 only | $I/G$ |
| 54 only | $I/G$ |
| 50 and 52 | $\frac{1}{3}I/G$ |
| 50 and 54 | $\frac{1}{3}I/G$ |
| 52 and 54 | $\frac{1}{2}I/G$ |
| all three | $\frac{1}{4}I/G$ |

If, in the above example, $I/G$ is so chosen, for example, that $V_T=3/4\ I/G$, the circuit will produce an output if there are two or more "1" inputs. If there is only one "1" input, the circuit will not produce an output unless that input is input 50. Input 50 is thus "weighted," in this instance by a factor of two.

Broadly stated, the circuit of FIG. 3 is capable, when provided with n inputs and n data input transistors, of carrying out the operation $$F=1 \text{ if } \sum_{1=1}^{n} X_iW_i \geq T$$

$$F=0 \text{ if } \sum_{1=1}^{n} X_iW_i < T$$

where $F$ is the output, $X$ is the binary input of each data channel, $W$ is the weight assigned to each data input, $n$ is the number of data channels, and $T$ is the threshold value $I/V_T$.

FIG. 4 shows a full adder logic bases on the weighted circuitry just described, and adapted to carry out the same function as the prior art logic of FIG. 2. In FIG. 4, the two inputs and the carry from the previous stage are applied to the input terminals A, B and C, respectively, which are connected to a three-channel threshold gate 82 and to three channels of a four-channel threshold gate 84, in each instance with a weight of 1. The threshold of gate 84 is set at a total weight of 1.5. The output of the gate 82 is the carry output which appears at the output terminal $C_o$. This output is inverted by an inverter 86 and is applied to the fourth channel of gate 84 with a weight of 2. The threshold of gate 84 is set at a total weight of 2.5. The output of gate 84 is the sum output which appears at the output terminal S. Why this is true will be readily apparent from Table II below:

TABLE II

| A | B | C | Total weight | $C_o$ | $\overline{C_o}$ | Total weight | S |
|---|---|---|---|---|---|---|---|
| 0 | 0 | 0 | 0 | 0 | 1 | 2 | 0 |
| 1 | 0 | 0 | 1 | 0 | 1 | 3 | 1 |
| 0 | 1 | 0 | 1 | 0 | 1 | 3 | 1 |
| 0 | 0 | 1 | 1 | 0 | 1 | 3 | 1 |
| 1 | 1 | 0 | 2 | 1 | 0 | 2 | 0 |
| 1 | 0 | 1 | 2 | 1 | 0 | 2 | 0 |
| 0 | 1 | 1 | 2 | 1 | 0 | 2 | 0 |
| 1 | 1 | 1 | 3 | 1 | 0 | 3 | 1 |

FIG. 5 shows the actual circuit corresponding to the logic diagram of FIG. 4. In FIG. 5, the threshold gate 82 is composed of data input transistors 90, 92, 94, sampling transistor 96, and inverter 98. Threshold gate 84 is composed of data input transistors 99, 100, 102, 104, sampling transistor 106, and inverter 108. All the data input transistors have the saMe "on" resistance except transistor 99. The latter has only half the "on" resistance of the other data input transistors and is therefore weighted by a factor of 2, as explained hereinabove. The capacitance 110 is the input capacitance of the circuitry to which the adder delivers its sum output.

A comparison of FIGS. 4 and 5 with FIGS. 1 and 2 shows the superiority of the adder of this invention over the prior art device. As is evident from FIG. 1, an IGFET NOR gate requires $n+1$ transistors, were $n$ is the number of data inputs to the gate. Consequently, the nine NOR gates of FIG. 2 require a total of 28 transistors. By contrast, the circuit of FIG. 5 requires only 15 transistors to perform the same function. At the same time, the six logic levels of FIG. 2 have been reduced to two in FIG. 4.

Figure 7:
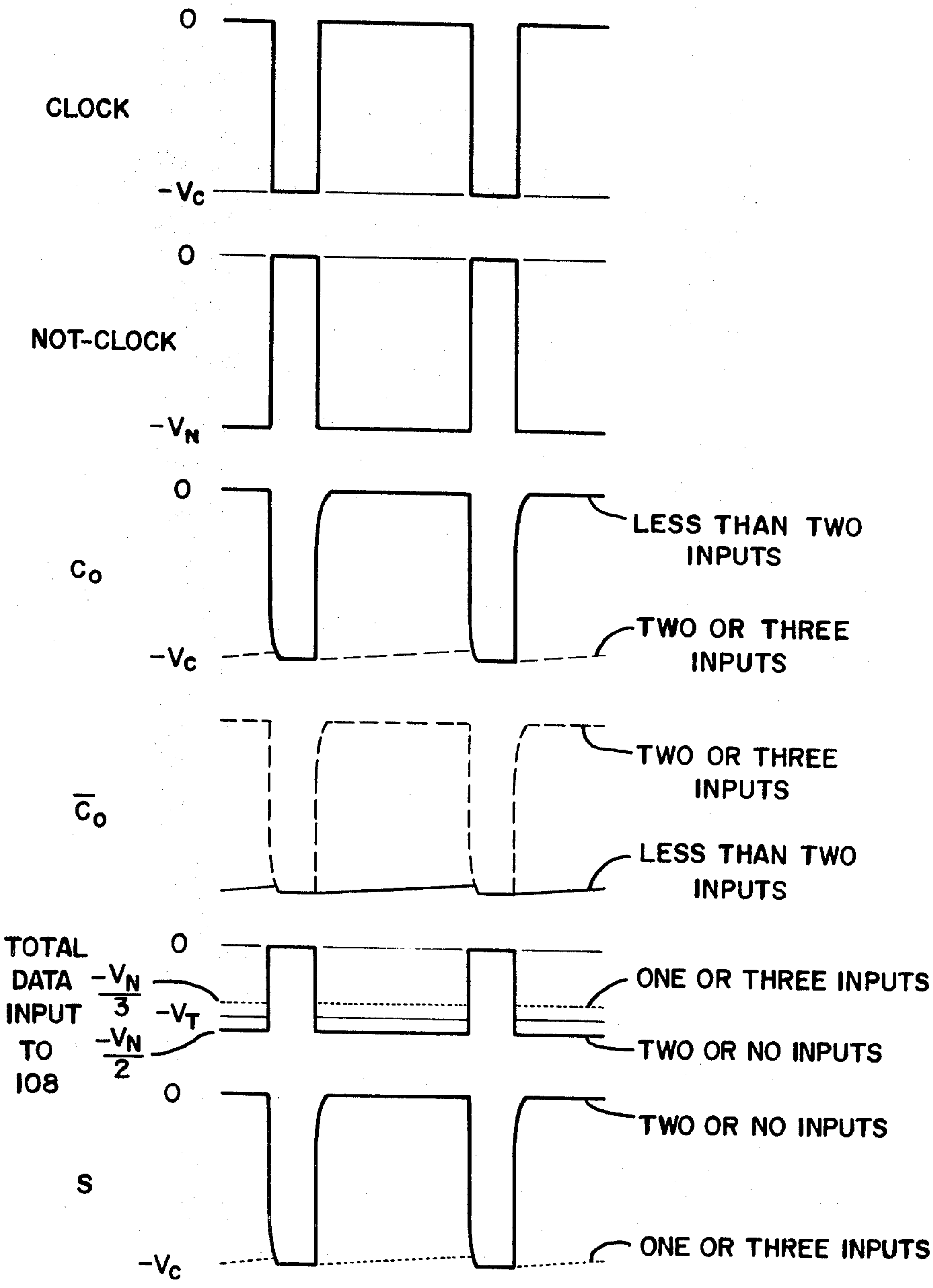
FIG. 7 is a time-amplitude graph illustrating the action of the circuit of FIG. 5.

FIG. 7 shows the various voltages associated with the circuit of FIG. 5 as a function of time. It will be noted that, with inputs being sensed between clock pulses, the output waveforms of $C_0$ and S conform to the arithmetic requirements of the binary addition chart of Table II.

I claim:

1. A threshold logic circuit, comprising:
a. a data output terminal;
b. a plurality of data input terminals;
c. means for producing an output at said output terminal in response to an input voltage having a predetermined relation to a predetermined threshold voltage;
transistors a plurality of field effect transistors connected in parallel, each of said transistors being gated by data from one of said data input terminals;
e. means in series with said parallel combination of transistors and with a source of potential and cooperating with said parallel transistor combination to form a voltage divider; and
f. means for applying the voltage appearing at the center tap of said voltage divider to the voltage input of said output-producing means.

2. The logic of claim 1, in which said output-producing means is a field effect transistor inverter.

3. The logic of claim 1, in which said series means is a field effect transistor gated by said potential.

4. The logic of claim 1, in which the "on" resistances of said parallel-connected transistors are substantially equal.

5. The logic of claim 1, in which at least one of said parallel-connected transistors has an "on" resistance differing from the "on" resistance of another of said parallel-connected transistors so as to weight the input of said one transistor differently than the input of said other transistor.

6. An all-IGFET threshold logic circuit for integrated circuits, comprising:
a. first and second synchronized timing pulse sources;
b. a plurality of input data sources;
c. an output terminal;
d. a plurality of data input IGFET's connected in parallel and gated, respectively, by said plurality of input data;
e. a sampling IGFET connected in series with said parallel combination of data input IGFET's and with said first timing pulse source; and
f. an IGFET inverter including:
i. a pair of parallel-connected IGFET's connected between said second timing pulse source and said output terminal, one of said pair of IGFET's being gated by said second timing pulse source, and the gate of the other of said pair of IGFET's being connected to a point between said sampling IGFET and said parallel combination of data input IGFET's; and
ii. output data storage capacitance means operatively associated with said output terminal.

7. The circuit of claim 6 wherein the "on" resistances of said plurality of parallel-connected IGFET's are substantially substantially equal.

8. The circuit of claim 6, in which the "on" resistances of said sampler and data input IGFET's are so proportioned that said one of said pair of IGFET's conducts only if fewer than a predetermined number of said data input IGFET's conduct.

9. The circuit of claim 8, in which at least one of said data input IGFET's has an "on" resistance substantially different from the "on" resistance of another of said data input IGFET's so as to weight data applied thereto differently than data applied to said other data input IGFET.

10. The circuit of claim 9, in which the "on" resistances of said sampler and data input IGFET's are so proportioned that said one of said pair of IGFET's conducts only if the total of the weights of conducting data input IGFET's is less than a predetermined threshold amount.

11. The circuit of claim 6, in which the "on" resistances of said sampling IGFET is so proportioned with respect to the "on" resistances of said data input IGFET's that said first timing pulse source and said sampling IGFET represent essentially a current source.

12. The circuit of claim 6, in which said first and second timing pulse sources are "not-clock" and "clock" generators.

13. A full adder binary logic comprising
a. first and second threshold gates, each including a plurality of insulated gate field effect transistors as active circuit elements;
b. three addend inputs to each of said gates, a separate one of said transistors being associated with each input in each gate;
c. said first gate being set to produce an output when two or more of said addend inputs are at logic "1";
d. inverter means including at least one insulated gate field effect transistor for inverting the output of said first gate;
e. a single fourth input to said second gate connected to the output of said inverter means and weighted at a greater weight than any of said addend inputs; and
f. said second gate being set to produce an output only when the total weight of its inputs at logic "1" is greater than the weight of said fourth input alone and greater than the combined weight of any two of the other three inputs alone,
whereby the output of said second gate is the sum and the output of said first gate is the carry of the binary addition of said addend inputs.

14. An all-IGFET binary full adder circuit for single-chip integrated logic circuits, comprising:
a. first and second synchronized synchronized timing pulse sources;
b. first and second threshold gates each including:
i. a plurality of data input terminals;
ii. an output terminal;
iii. a plurality of data input IGFET's connected in parallel and gated, respectively, by said plurality of input data;
iv. a sampling IGFET connected in series with said parallel combination of data input IGFET's and with said first timing pulse source; and
v. an IGFET inverter including a pair of parallel-connected IGFET's connected between said second timing pulse source and said output terminal, one of said pair of IGFET's being gated by said second timing pulse source, and the gate of the other of said pair of IGFET's being connected to a point between said sampling IGFET and said parallel combination of data input IGFET's;
c. means for supplying addend inputs to three input terminals of each of said gates;
d. said first gate being set to produce an output when two or more of said addend inputs are at logic "1";
e. a fourth input to said second gate weighted at a greater weight than any of said addend inputs;
f. inverter means including
i. an input terminal connected to the output terminal of said first threshold gate;
ii. an output terminal connected to said fourth input terminal of said second threshold gate; and
iii. a pair of parallel-connected IGFET's connected between said second timing pulse source and said output terminal of said inverter means and gated, respectively, by said second timing pulse source and said output of said first threshold gate;
g. said second gate being set to produce an output only when the total weight of its inputs at logic "1" is greater than the weight of said fourth input alone and greater than the combined weight of any two of the other three inputs alone; and
h. an output data storage capacitance operatively associated with said output terminal of said second threshold gate,
whereby the sum of the binary addition of said addends appears at said output terminal of said second threshold gate, and the carry of said addition appears at said output terminal of said first threshold gate.

15. The circuit of claim 14, in which said first and second timing pulse sources are "not-clock" and "clock" generators.

16. The circuit of claim 14, in which the "on" resistances of said sampling IGFET's are so proportioned with respect to the "on" resistances of said data input IGFET's that said first timing pulse source and said sampling IGFET's represent essentially current sources.